United States Patent
Guérin

(10) Patent No.: US 11,558,557 B2
(45) Date of Patent: *Jan. 17, 2023

(54) GENERATION OF ENHANCED PANORAMIC VISUAL CONTENT

(71) Applicant: GoPro, Inc., San Mateo, CA (US)

(72) Inventor: Guillaume Matthieu Guérin, Chatillon (FR)

(73) Assignee: GoPro, Inc., San Mateo, CA (US)

(*) Notice: Subject to any disclaimer, the term of this patent is extended or adjusted under 35 U.S.C. 154(b) by 23 days.

This patent is subject to a terminal disclaimer.

(21) Appl. No.: 17/239,589

(22) Filed: Apr. 24, 2021

(65) Prior Publication Data

US 2021/0258468 A1    Aug. 19, 2021

Related U.S. Application Data

(63) Continuation of application No. 16/971,850, filed on Feb. 14, 2020, now Pat. No. 10,999,527.

(51) Int. Cl.
  *H04N 5/235* (2006.01)
  *G06T 3/40* (2006.01)
  *H04N 5/232* (2006.01)
  *G06T 3/00* (2006.01)

(52) U.S. Cl.
  CPC .......... *H04N 5/2355* (2013.01); *G06T 3/0062* (2013.01); *G06T 3/4038* (2013.01); *H04N 5/2353* (2013.01); *H04N 5/23238* (2013.01)

(58) Field of Classification Search
  CPC ............ H04N 5/2355; H04N 5/2258; H04N 5/23238; G06T 5/009; G06T 5/007; G06T 3/4038; G06T 2207/20208; G06T 2200/32
  See application file for complete search history.

(56) References Cited

U.S. PATENT DOCUMENTS

| | | |
|---|---|---|
| 10,194,097 B2 | 1/2019 | Abbas |
| 10,462,466 B2 | 10/2019 | Abbas |
| 10,469,744 B2 | 11/2019 | Yim |
| 10,587,855 B1 | 3/2020 | Chinnaiyan |
| 10,614,553 B1 | 4/2020 | Wang |

(Continued)

FOREIGN PATENT DOCUMENTS

JP    6541327 B2    7/2019

OTHER PUBLICATIONS

Aggarwal et al.; "High Dynamic Range Panoramic Imaging"; Jan. 2001; Proceedings Eighth IEEE International Conference on Computer Vision. ICCV 2001 (vol. 1, pp. 2-9 vol. 1) (Year: 2001).

(Continued)

*Primary Examiner* — John Villecco
(74) *Attorney, Agent, or Firm* — Esplin & Associates, PC

(57) ABSTRACT

An image capture device may capture two hemispherical views of a scene. The two hemispherical view of the scene may be stitched along a stitch line. The image capture device may be rotated to align the stitch line with a mid-line of a panoramic field of view of the scene. Separate exposure settings may be used to capture the two hemispherical views of the scene, with the exposure settings increasing the dynamic range of the scene depicted within the panoramic field of view of the scene. The panoramic field of view of the scene may be punched out as panoramic visual content.

20 Claims, 9 Drawing Sheets

(56) References Cited

U.S. PATENT DOCUMENTS

| | | | |
|---|---|---|---|
| 10,643,303 B1 | 5/2020 | Cotoros | |
| 10,848,731 B2 | 11/2020 | Simek | |
| 10,887,570 B2 | 1/2021 | Chinnaiyan | |
| 10,893,218 B1 | 1/2021 | Douady | |
| 10,917,565 B1 | 2/2021 | Gilmour | |
| 10,999,527 B1 * | 5/2021 | Guérin | H04N 5/247 |
| 11,323,603 B2 * | 5/2022 | Guérin | H04N 5/23238 |
| 11,388,332 B2 * | 7/2022 | Watanabe | G03B 19/22 |
| 11,393,070 B2 * | 7/2022 | Kawaguchi | H04N 5/2258 |
| 2012/0206565 A1 | 8/2012 | Villmer | |
| 2018/0144520 A1 | 5/2018 | Forutanpour | |
| 2018/0276800 A1 | 9/2018 | Abbas | |
| 2018/0374192 A1 | 12/2018 | Kunkel | |
| 2019/0014350 A1 | 1/2019 | Wang | |
| 2019/0347863 A1 | 11/2019 | Sanguinetti | |
| 2020/0128280 A1 | 4/2020 | Han | |
| 2020/0204778 A1 | 6/2020 | Chinnaiyan | |
| 2020/0219300 A1 | 7/2020 | Ishikawa | |
| 2020/0273149 A1 | 8/2020 | Qin | |
| 2020/0304751 A1 | 9/2020 | Katoh | |
| 2020/0358944 A1 | 11/2020 | Douady | |
| 2020/0366842 A1 | 11/2020 | Oulès | |
| 2021/0084205 A1 * | 3/2021 | Guérin | H04N 5/2353 |
| 2021/0144293 A1 * | 5/2021 | Shibagami | H04N 5/23293 |
| 2021/0233209 A1 * | 7/2021 | Yoshida | G06T 5/50 |
| 2022/0006949 A1 * | 1/2022 | Watanabe | H04N 5/247 |
| 2022/0078328 A1 * | 3/2022 | Kazama | H04N 5/265 |
| 2022/0198605 A1 * | 6/2022 | Pitts | G06T 5/50 |
| 2022/0224831 A1 * | 7/2022 | Yoshida | H04N 5/23238 |

OTHER PUBLICATIONS

Jusof et al.; "Revealing visual details via high dynamic range gigapixels spherical panorama photography: The Tempurung Cave natural heritage site"; Dec. 2014; 2014 International Conference on Virtual Systems & Multimedia (VSMM) (pp. 193-200) (Year: 2014).

* cited by examiner

GENERATION OF ENHANCED PANORAMIC VISUAL CONTENT

FIELD

This disclosure relates to generating enhanced panoramic visual content using different exposure settings for multiple image sensors.

BACKGROUND

A panoramic view of a scene may be captured by punching out a portion of a spherical image. The punchout may be centered on the field of view of the front or back lens to place the stitch line for the spherical image in the peripheral portion of the punchout.

SUMMARY

This disclosure relates to generating enhanced panoramic visual content. An image capture device may include a housing. The housing may carry one or more of a first image sensor, a second image sensor, a first optical element configured to guide light within a first field of view to the first image sensor, a second optical element configured to guide light within a second field of view to the second image sensor, and/or other components. The first image sensor may generate a first visual output signal conveying first visual information based on light that becomes incident thereon. The first visual information may define first visual content. The second image sensor may generate a second visual output signal conveying second visual information based on light that becomes incident thereon. The second visual information may define second visual content. An overlap of a peripheral portion of the first field of view and a peripheral portion of the second field of view overlap may enable spherical capture of visual content based on stitching of the first visual content and the second visual content. A stitch line for stitching of the first visual content and the second visual content may be positioned within the overlap.

A first exposure setting may be determined to capture the first visual content with the housing rotated into an enhanced panoramic rotational position. The enhanced panoramic rotational position may include the stitch line aligned with a mid-line of a panoramic field of view of a scene to be included within the enhanced panoramic visual content. The first exposure setting may be determined based on a first luminance of the scene included within the first field of view and/or other information. A second exposure setting may be determined to capture the second visual content with the housing rotated into the enhanced panoramic rotational position. The second exposure setting may be determined based on a second luminance of the scene included within the second field of view and/or other information. The first exposure setting may be different from the second exposure setting based on the first luminance of the scene being different from the second luminance of the scene. The first visual content may be captured with the housing rotated into the enhanced panoramic rotational position by applying the first exposure setting to the first image sensor. The second visual content may be captured with the housing rotated into the enhanced panoramic rotational position by applying the second exposure setting to the second image sensor. The enhanced panoramic visual content may be generated based on stitching and cropping of the first visual content and the second visual content. The enhanced panoramic visual content may have the panoramic field of view.

A system that generates enhanced panoramic visual content may include one or more electronic storages, one or more processors, and/or other components. An electronic storage may store visual information defining visual content, information relating to visual content, information relating to optical element, information relating to field of view of optical element, information relating to stitching of visual content, information relating to stitch line for stitching visual content, information relating to cropping of visual content, information relating to exposure setting, information relating to enhanced panoramic rotational position, information relating to enhanced panoramic visual content, and/or other information. In some implementations, the system may include multiple image sensors, multiple optical elements, one or more displays, and/or other components. For example, the system may include a first image, a second image sensor, a first optical element, a second optical element, and/or a display.

One or more components of the system may be carried by a housing, such as a housing of an image capture device. For example, the optical element(s) and/or the image sensor(s) of the system may be carried by the housing of an image capture device. The housing may carry other components, such as the display, the processor(s), and/or the electronic storage.

The first image sensor may be configured to generate a first visual output signal conveying first visual information based on light that becomes incident thereon. The first visual information may define first visual content. The second image sensor may be configured to generate a second visual output signal conveying second visual information based on light that becomes incident thereon. The second visual information may define second visual content.

The first optical element may be configured to guide light within a first field of view to the first image sensor. The first field of view may be greater than 180 degrees. The second optical element may be configured to guide light within a second field of view to the second image sensor. The second field of view may be greater than 180 degrees. The first optical element and the second optical element may be carried by the housing such that a peripheral portion of the first field of view and a peripheral portion of the second field of view overlap. The overlap of the peripheral portion of the first field of view and the peripheral portion of the second field of view may enable spherical capture of visual content based on stitching of the first visual content and the second visual content. A stitch line for stitching of the first visual content and the second visual content may be positioned within the overlap.

The processor(s) may be configured by machine-readable instructions. Executing the machine-readable instructions may cause the processor(s) to facilitate generating enhanced panoramic visual content. The machine-readable instructions may include one or more computer program components. The computer program components may include one or more of an exposure setting component, a capture component, a generation component, and/or other computer program components.

The exposure setting component may be configured to determine exposure settings to capture visual content through the optical elements. The exposure setting component may be configured to determine a first exposure setting to capture the first visual content with the housing rotated into an enhanced panoramic rotational position. The enhanced panoramic rotational position may include the stitch line aligned with a mid-line of a panoramic field of view of a scene to be included within the enhanced panoramic visual content. The first exposure setting may be determined based on a first luminance of the scene included within the first field of view and/or other information. In some implementations, the first exposure setting may define an exposure time and an ISO value for the capture of the first visual content.

In some implementations, the mid-line of the panoramic field of view of the scene may divide the scene into a bright scene portion and a dark scene portion. In some implementations, the mid-line of the panoramic field of view may include a vertical mid-line of the panoramic field of view. In some implementations, the mid-line of the panoramic field of view may include a horizontal mid-line of the panoramic field of view. In some implementations, the mid-line of the panoramic field of view may include a slanted mid-line of the panoramic field of view.

The exposure setting component may be configured to determine a second exposure setting to capture the second visual content with the housing rotated into the enhanced panoramic rotational position. The second exposure setting may be determined based on a second luminance of the scene included within the second field of view and/or other information. The first exposure setting may be different from the second exposure setting based on the first luminance of the scene being different from the second luminance of the scene. In some implementations, the first exposure setting and the second exposure setting may be determined to increase dynamic range of the scene depicted within the enhanced panoramic visual content.

In some implementations, the display may present at least a portion of the panoramic field of view of the scene as a preview of the enhanced panoramic visual content. The preview including one or more visual indicators representing the stitch line. In some implementations, the display may present one or more differences between the first exposure setting and the second exposure setting. In some implementations, the display may present one or more differences between the first luminance of the scene and the second luminance of the scene.

The capture component may be configured to capture visual content through the optical elements. The capture component may be configured to capture the first visual content with the housing rotated into the enhanced panoramic rotational position by applying the first exposure setting to the first image sensor. The capture component may be configured to capture the second visual content with the housing rotated into the enhanced panoramic rotational position by applying the second exposure setting to the second image sensor.

The generation component may be configured to generate the enhanced panoramic visual content based on stitching and cropping of the first visual content and the second visual content. The enhanced panoramic visual content may have the panoramic field of view.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 4A and 4B illustrate example viewing windows for spherical visual content.

DETAILED DESCRIPTION

Figure 1:
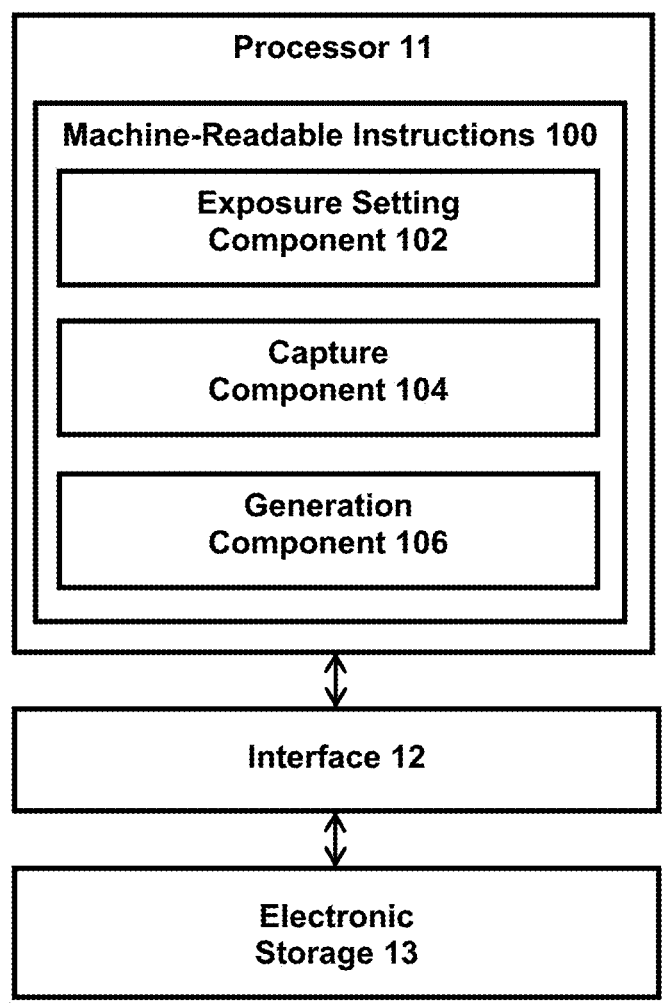
FIG. 1 illustrates an example system that generates enhanced panoramic visual content.

FIG. 1 illustrates a system 10 for generating enhanced panoramic visual content. The system 10 may include one or more of a processor 11, an interface 12 (e.g., bus, wireless interface), an electronic storage 13, and/or other components. In some implementations, the system 10 may include multiple optical elements, multiple image sensors, one or more displays, and/or other components. For example, the system 10 may include a first image, a second image sensor, a first optical element, a second optical element, and/or a display. An image capture device may include housing. The housing may carry one or more of a first image sensor, a second image sensor, a first optical element configured to guide light within a first field of view to the first image sensor, a second optical element configured to guide light within a second field of view to the second image sensor, and/or other components. The first image sensor may generate a first visual output signal conveying first visual information based on light that becomes incident thereon. The first visual information may define first visual content. The second image sensor may generate a second visual output signal conveying second visual information based on light that becomes incident thereon. The second visual information may define second visual content. An overlap of a peripheral portion of the first field of view and a peripheral portion of the second field of view overlap may enable spherical capture of visual content based on stitching of the first visual content and the second visual content. A stitch line for stitching of the first visual content and the second visual content may be positioned within the overlap.

A first exposure setting may be determined by the processor 11 to capture the first visual content with the housing rotated into an enhanced panoramic rotational position. The enhanced panoramic rotational position may include the stitch line aligned with a mid-line of a panoramic field of view of a scene to be included within the enhanced panoramic visual content. The first exposure setting may be determined based on a first luminance of the scene included within the first field of view and/or other information. A second exposure setting may be determined by the processor 11 to capture the second visual content with the housing rotated into the enhanced panoramic rotational position. The second exposure setting may be determined based on a second luminance of the scene included within the second field of view and/or other information. The first exposure setting may be different from the second exposure setting based on the first luminance of the scene being different from the second luminance of the scene.

The first visual content may be captured by the processor 11 with the housing rotated into the enhanced panoramic rotational position by applying the first exposure setting to the first image sensor. The second visual content may be captured by the processor 11 with the housing rotated into the enhanced panoramic rotational position by applying the second exposure setting to the second image sensor. The enhanced panoramic visual content may be generated by the processor 11 based on stitching and cropping of the first visual content and the second visual content. The enhanced panoramic visual content may have the panoramic field of view.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to optical element, information relating to field of view of optical element, information relating to stitching of visual content, information relating to stitch line for stitching visual content, information relating to cropping of visual content, information relating to exposure setting, information relating to enhanced panoramic rotational position, information relating to enhanced panoramic visual content, and/or other information.

Visual content may refer to content of one or more images and/or one or more videos that may be consumed visually. For example, visual content may be defined within one or more images and/or one or more video frames of a video. A video frame may refer to one or more of an image frame, frame of pixels, encoded frame (e.g., I-frame, P-frame, B-frame), and/or other types of video frame. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Visual information may define visual content and/or other content captured by one or more image capture devices. The visual information may define visual content by including information that defines one or more content, qualities, attributes, features, and/or other aspects of the visual content. For example, the visual information may define visual content of an image, a video frame, and/or a video by including information that makes up the content of the image, the video frame, and/or the video, and/or information that is used to determine the content of the image, the video frame, and/or the video. For instance, the visual information may include information that makes up and/or is used to determine the arrangement of pixels, characteristics of pixels, values of pixels, and/or other aspects of pixels that define visual content of the image, the video frame, and/or the video. For example, the visual information may include information that makes up and/or is used to determine pixels of the image or video frame(s) of the video. Other types of visual information are contemplated.

Visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture).

Spherical visual content may be generated based on light received within a field of view of a single image sensor or within fields of view of multiple image sensors during a capture period. For example, multiple images/videos captured by multiple cameras/image sensors may be combined/stitched together to form the spherical visual content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical visual content.

Figure 3:
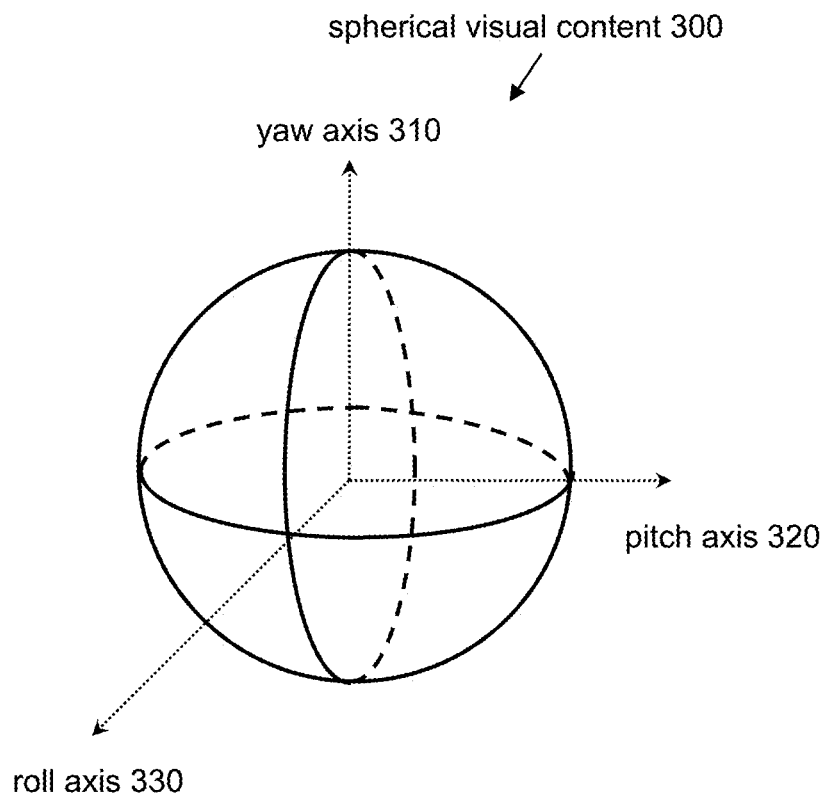
FIG. 3 illustrates example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

A portion of the spherical visual content may be extracted (punched out) using a viewing window. An extraction of visual content may include extraction of one or more portions of visual content (e.g., into a cropped image) based on a viewing window and/or other information. A viewing window may define extents of the visual content viewable on one or more displays and/or extents of the visual content to be extracted. For video content, a viewing window may define extents of the visual content as the function of progress through the progress length of the video content. A viewing window may define extents of the visual content presented on the display(s)/extracted as the function of progress through the progress length of the video content. For spherical video content, the viewing window may define extents of the visual content from the point of view as the function of progress through the progress length of the spherical video content.

Figure 4B:
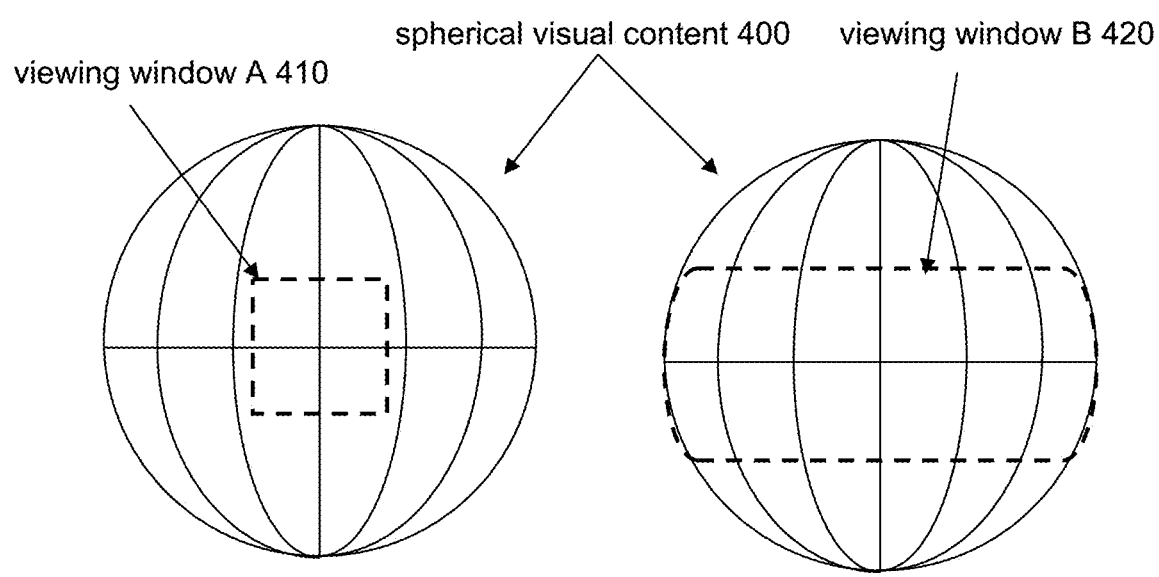

FIGS. 4A-4B illustrate example viewing windows for spherical visual content 500. In FIG. 4A, a viewing window A 410 may define a square extent of the spherical visual content 400. The viewing window A 410 may be used to provide a 1:1 punchout of the spherical visual content 400. The extent of the spherical visual content 400 within the viewing window A 410 may be extracted for presentation on a display and/or for storage in a file (e.g., image file, video file). In FIG. 4B, a viewing window B 420 may define a panoramic extent of the spherical visual content 400. The viewing window B 440 may be used to provide a panoramic/widefield punchout of the spherical visual content 400. The extent of the spherical visual content 400 within the viewing window B 420 may be extracted for presentation on a display and/or for storage in a file (e.g., image file, video file). Other viewing windows are contemplated.

Figure 5:
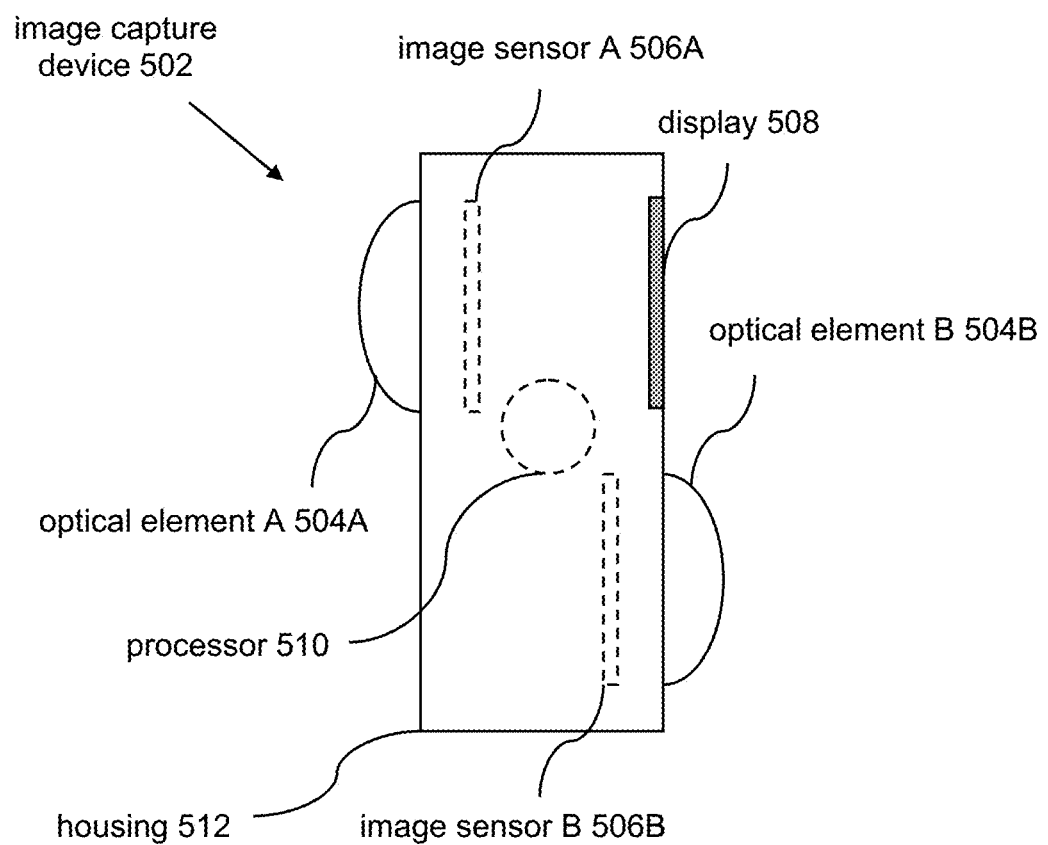
FIG. 5 illustrates an example image capture device.

An image capture device may refer to a device for recording visual information in the form of images, videos, and/or other media. An image capture device may refer to a device captures visual content. An image capture device may capture visual content in form of images, videos, and/or other forms. For example, an image capture device may refer to a camera and/or an image sensor. An image capture device may be a standalone device (e.g., camera) or may be part of another device (e.g., part of a smartphone). FIG. 5 illustrates an example image capture device 502. Visual content may be captured by the image capture device 502 during a capture duration. The image capture device 502 may include a housing 512. The housing 512 may refer a device (e.g., casing, shell) that covers, protects, and/or supports one or more components of the image capture device 502. The housing 512 may include a single-piece housing or a multi-piece housing. The housing 512 may carry (be attached to, support, hold, and/or otherwise carry) one or more of an optical element A 504A, an optical element B 504B, an image sensor A 506A, an image sensor B 506B, a display 508, a processor 510, and/or other components. The display 508 may present visual content captured/to be captured by the image capture device 502. The visual content may be presented before capture of visual content (capture preview), during capture of visual content, and/or after capture of visual content.

One or more components of the image capture device 502 may be the same as, be similar to, and/or correspond to one or more components of the system 10. For example, the processor 510 may be the same as, be similar to, and/or correspond to the processor 11. The image capture device 502 may include other components not shown in FIG. 3. The image capture device 502 may not include one or more components shown in FIG. 3. Other configurations of image capture devices are contemplated.

The optical elements 504A, 504B may include instrument(s), tool(s), and/or medium that acts upon light passing through the instrument(s)/tool(s)/medium. For example, the optical elements 504A, 504B may include one or more of lens, mirror, prism, and/or other optical elements. The optical elements 504A, 504B may affect direction, deviation, and/or path of the light passing through the optical elements 504A, 504B. While the optical elements 504A, 504B are shown in a staggered configuration, this is merely an example and other configurations of optical elements are contemplated.

The image sensors 506A, 506B may include sensor(s) that converts received light into output signals. The output signals may include electrical signals. The image sensors 506A, 506B may generate output signals conveying information that defines visual content of one or more images and/or one or more video frames of a video. For example, the image sensors 506A, 506B may include one or more of a charge-coupled device sensor, an active pixel sensor, a complementary metal-oxide semiconductor sensor, an N-type metal-oxide-semiconductor sensor, and/or other image sensors.

The image sensors 506A, 506B may be configured to generate visual output signals conveying visual information (defining visual content of images and/or videos) based on light that becomes incident thereon and/or other information. The optical element A 504A may be configured to guide light within a field of view to the image sensor A 506A, and the image sensor A 506A may be configured to generate output signals conveying visual information based on light that becomes incident thereon via the optical element A 504A. The optical element B 504B may be configured to guide light within a field of view to the image sensor B 506B, and the image sensor B 506B may be configured to generate output signals conveying visual information based on light that becomes incident thereon via the optical element B 504B. The fields of view of the optical elements 504A, 504B may refer to the extents of the observable world that is seen through the optical elements 504A, 504B. The field of views of the optical elements 504A, 504B may include one or more angles (e.g., vertical angle, horizontal angle, diagonal angle) at which light is received and passed on by the optical elements 504A, 504B. The fields of view of the optical elements 504A, 504B may be the same or different.

The fields of view of the optical elements 504A, 504B may be greater than or equal to 180-degrees. The optical elements 504A, 504B may be carried by the housing 512 such that peripheral portions of the fields of view of the optical elements 504A, 504B overlap. The overlap of the peripheral portions of the fields of view of the optical elements 504A, 504B may enable capture of spherical visual content (e.g., of images and/or videos) based on the visual information conveyed by the output signals of the image sensors 506A, 506B.

The overlap of the peripheral portions of the fields of view of the optical elements 504A, 504B may enable spherical capture of visual content based on stitching of visual content defined by the visual information of the image sensor A 506A (visual content captured by the image sensor A 506A) and visual content defined by the visual information of the image sensor B 506B (visual content captured by the image sensor B 506B). Stitching of visual content may refer to process of combining separate visual content (e.g., separate images) with overlapping fields of view to produce a wider field of view visual content. For example, the light guided to the image sensor A 506A by the optical element A 504A may be used to generate one hemispherical view of a scene (with at least 180 field of view), and the light guided to the image sensor B 506BA by the optical element B 504B may be used to generate another (opposing) hemispherical view of the scene. Separate visual content captured by the image sensors 506A, 506B may be stitched along a stitch line to generate a spherical view of the scene. A stitch line may refer to a line that divides one visual content from another visual content. A stitch line may refer to a line at which separate visual content are combined. A stitch line for stitching of separate visual content captured by the image sensors 506A, 506B may be positioned within the overlap of the peripheral portions of the fields of view of the optical elements 504A, 504B.

The processor 510 may include one or more processors (logic circuitry) that provide information processing capabilities in the image capture device 502. The processor 510 may provide one or more computing functions for the image capture device 502. The processor 510 may operate/send command signals to one or more components of the image capture device 502 to operate the image capture device 502. For example, the processor 510 may facilitate operation of the image capture device 502 in capturing image(s) and/or video(s), facilitate operation of the optical elements 504A, 504B (e.g., change how light is guided by the optical elements 504A, 504B), and/or facilitate operation of the image sensors 506A, 506B (e.g., change how the received light is converted into information that defines images/videos and/or how the images/videos are post-processed after capture).

The processor 510 may obtain information from the image sensors 506A, 506B and/or the position sensor 508, and/or facilitate transfer of information from the image sensors 506A, 506B and/or the position sensor 508 to another device/component. The processor 510 may be remote from the processor 11 or local to the processor 11. One or more portions of the processor 510 may be part of the processor 11 and/or one or more portions of the processor 11 may be part of the processor 510. The processor 510 may include and/or perform one or more functionalities of the processor 11 shown in FIG. 1.

The image capture device 502 may capture two hemispherical views of a scene seen through the optical elements 504A, 504B. The two hemispherical view of the scene may be stitched along a stitch line. A punchout of the stitched visual content may be used to generate a panoramic view of the scene. To increase the dynamic range of the scene within the panoramic view, the image capture device 502 may be rotated to align the stitch line with a mid-line of a panoramic view of the scene. Separate exposure settings may be used by the image sensors 506A, 506B to capture the two hemispherical views of the scene, and the exposure settings may be set to increase the dynamic range of the scene depicted within the panoramic view of the scene. The panoramic view of the scene may be punched out as panoramic visual content.

Referring back to FIG. 1, the system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device. For instance, optical element(s) and/or image sensor(s) of the system 10 may be carried by the housing of the image capture device. The housing may carry other components, such as the processor 11, the electronic storage 13, and/or display(s). References to a housing of an image capture device may refer to the image capture device, and vice versa. For example, references to position/rotation of a housing of an image capture device may refer to position/rotation of the image capture device, and vice versa.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating enhanced panoramic visual content. The machine-readable instructions 100 may include one or more computer program components. The machine-readable instructions 100 may include one or more of an exposure setting component 102, a capture component 104, a generation component 106, and/or other computer program components.

The exposure setting component 102 may be configured to determine exposure settings to be used by image sensors to capture visual content through optical elements. The exposure setting component 102 may determine separate exposure settings for separate image sensors. For example, referring to FIG. 5, the exposure setting component 102 may determine an exposure setting for the image sensor A 506A to capture visual content through the optical element A 504A, an exposure setting for the image sensor B 506B to capture visual content through the optical element B 504B, and/or other exposure settings.

An exposure setting may refer to one or more operation parameters of the image capture device that determines brightness of visual content captured by an image sensor. An exposure setting may refer to one or more operation parameters of the image capture device that controls how and/or the amount of light guided by an optical element is exposed to the image sensor to convert into visual output signal/visual information. In some implementations, an exposure setting for an image sensor may define one or more of an exposure time (duration of exposure), an ISO value (film speed, image sensor sensitivity/gain), and/or other operating parameter to capture visual content through an optical element. In some implementations, an exposure setting for an image sensor may further define the aperture (opening size), and/or white balance (color balance).

The exposure setting component 102 may be configured to determine an exposure setting for an image sensor based on luminance of the scene included within the field of view of the corresponding optical element and/or other information. Luminance may refer to the intensity of light per unit area of light traveling in a given direction. For example, referring to FIG. 5, the exposure setting component may determine an exposure setting for the image sensor A 506A based on luminance of the scene included within the field of view of the optical element A 504A (luminance of light guided to the image sensor A 506A by the optical element A 504A), an exposure setting for the image sensor B 506B based on luminance of the scene included within the field of view of the optical element B 504B (luminance of light guided to the image sensor B 506B by the optical element B 504B), and/or other exposure settings. The exposure setting component 102 may determine an exposure setting for an image sensor based on total luminance, average luminance, distribution of luminance, and/or other quantification of luminance of the scene included within the field of view of the corresponding optical element. In some implementations, the exposure setting component 102 may determine an exposure setting for an image sensor based on luminance of the scene included within field(s) of view of other optical element(s). For example, the exposure setting component 102 may determine an exposure setting the image sensor A 506A based on combination of luminance of the scene included within the field of view of the optical element A 504A and luminance of the scene included within the field of view of the optical element B 504B. Such determination of exposure setting may introduce relationship for image quality and/or hardware constraint.

In some implementations, the exposure setting component 102 may be configured to determine an exposure setting for an image sensor based on content of the scene included within the field of view of the corresponding optical element and/or other information. Content of the scene may be determined based on visual analysis, visual recognition, computer vision, and/or other analysis of the visual content generated by the image sensor. Content of the scene may include identity of things depicted within the visual content, such as the type of environment included within the scene (e.g., beach, forest, snow, underwater, desert), number of things (e.g., persons, faces) included within the scene, position of things included within the scene, movement of objects included within the scene, visual aspects of things included within the scene (e.g., color, texture), and/or other aspects of things included within the scene.

In some implementations, the exposure setting component 102 may be configured to determine an exposure setting for an image sensor based on autobracketing. The exposure setting component 102 may cause the image capture device to successively capture multiple visual content with different exposure settings. Multiples of the visual content may be combined and/or one of the visual content may be selected for use in generating enhanced panoramic visual content. For example, bracketing of multiple exposures may be performed for individual image sensors, centered around nominal exposure value independently determined for individual image sensors. Visual content captured using different exposures may be fused to obtain separate HDR visual content (HDR images) with different exposures. The separate HDR visual content may be combined using stitching and/or tone mapping.

The exposure setting component 102 may be configured to determine exposure settings with the image capture device rotated into an enhanced panoramic rotational position and/or other position. An enhanced panoramic rotational position may refer to a rotational position (e.g., rotation, orientation) of the image capture device that enables increase in dynamic range of the scene depicted within the captured visual content. That is, capturing the visual content with the image capture device rotated into the enhanced panoramic rotational position may enable the image capture device to generate panoramic visual content with increased dynamic range. Panoramic visual content within increased dynamic range may be referred to as enhanced panoramic visual content. Dynamic range may refer to the difference between the maximum and the minimum of one or more visual qualities within the captured visual content. Dynamic range may refer to ratio between the maximum and the minimum light intensities (e.g., white and black) within the captured visual content. For instance, dynamic range may refer to the difference between the darkest and the lightest tones within the captured visual content.

The image capture device rotated into the enhanced panoramic rotational position may include the image capture device being positioned so that the stitch line for stitching visual content captured through different optical elements are pointed towards the middle of the scene to be captured within the enhanced panoramic visual content. The enhanced panoramic rotational position may include the stitch line aligned with a mid-line of a panoramic field of view of a scene to be included within the enhanced panoramic visual content. For example, referring to FIG. 5, the enhanced panoramic rotational position may include the image capture device 502 being positioned so that the stich line to stitch first hemispherical view of the scene captured through the optical element A 504A and second hemispherical view of the scene captured through the optical element B 504B is aligned with a mid-line of the punchout of stitched (e.g., spherical) visual content to be used to generate the enhanced panoramic visual content.

Figure 6A:
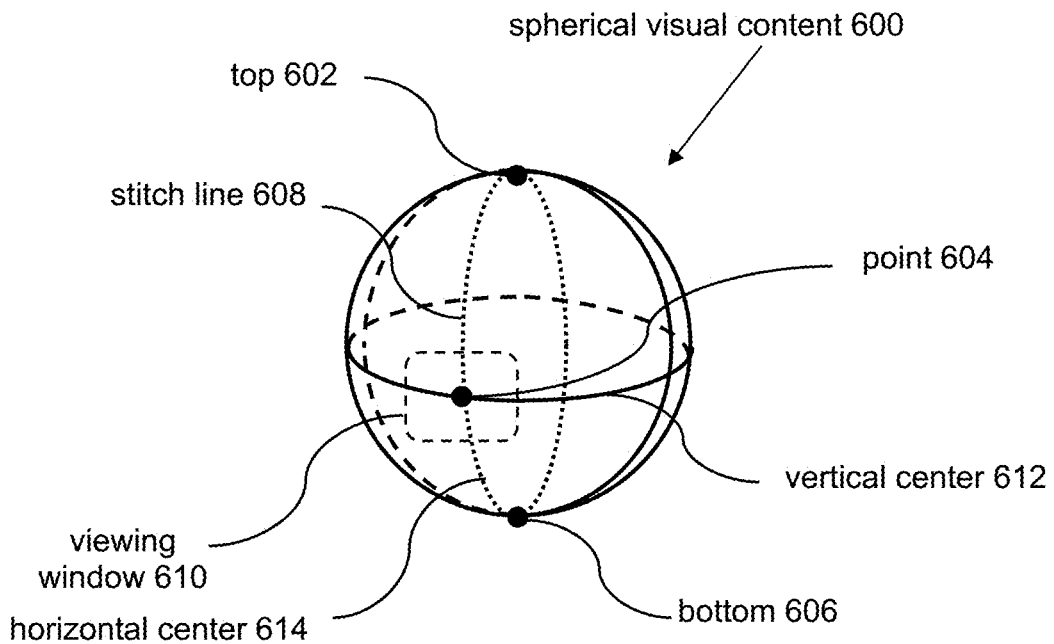
FIG. 6A illustrates example spherical visual content mapped onto a sphere.

FIG. 6A illustrates example spherical visual content 600 mapped onto a sphere. The spherical visual content 600 may include two hemispherical view of a scene may be stitched along a stitch line 608. For example, the left hemispherical view of a scene may be captured by the image sensor A 506A through the optical element A 504A and the right hemispherical view of the scene may be captured by the image sensor B 506B through the optical element B 504B. The two hemispherical views of the scene may be combined into the spherical visual content 600 by stitching along the stitch line 608.

Figure 6B:
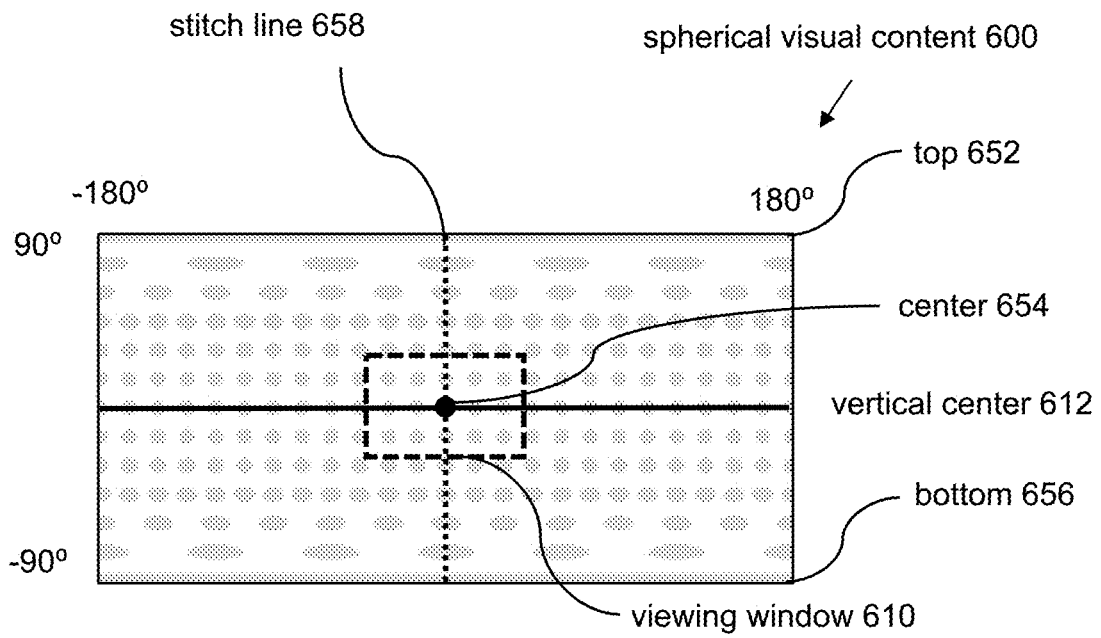
FIG. 6B illustrates example spherical visual content mapped onto a two-dimensional plane using an equirectangular projection.

FIG. 6B illustrates example spherical visual content 600 mapped onto a two-dimensional plane using an equirectangular projection. The mapping of the spherical visual content 600 onto the two-dimensional plane using the equirectangular projection may result in a pixel on the top of the spherical visual content 600 in the three-dimensional space (top 602 shown in FIG. 6A) being defined by multiple pixels along the top 652 of the two-dimensional plane, a pixel on the bottom of the spherical visual content 600 in the three-dimensional space (bottom 606 shown in FIG. 6A) being defined by multiple pixels along the bottom 656 of the two-dimensional plane, and a pixel along a vertical center 612 and along the stitch line 608 of the spherical visual content 600 in the three-dimensional space (point 604 shown in FIG. 6A) being defined by a pixel at a center 654 of the two-dimensional plane. The mapping of the spherical visual content 600 onto the two-dimensional plane using the equirectangular projection may result in a stitch line 658 (corresponding to the stitch line 608 in FIG. 6A) being positioned at horizontal center of the two-dimensional plane. The stitch line 658 may be positioned at the center of the spherical visual content 600 mapped onto the two-dimensional plane using the equirectangular projection.

A viewing window may define one or more extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

Figure 7A:
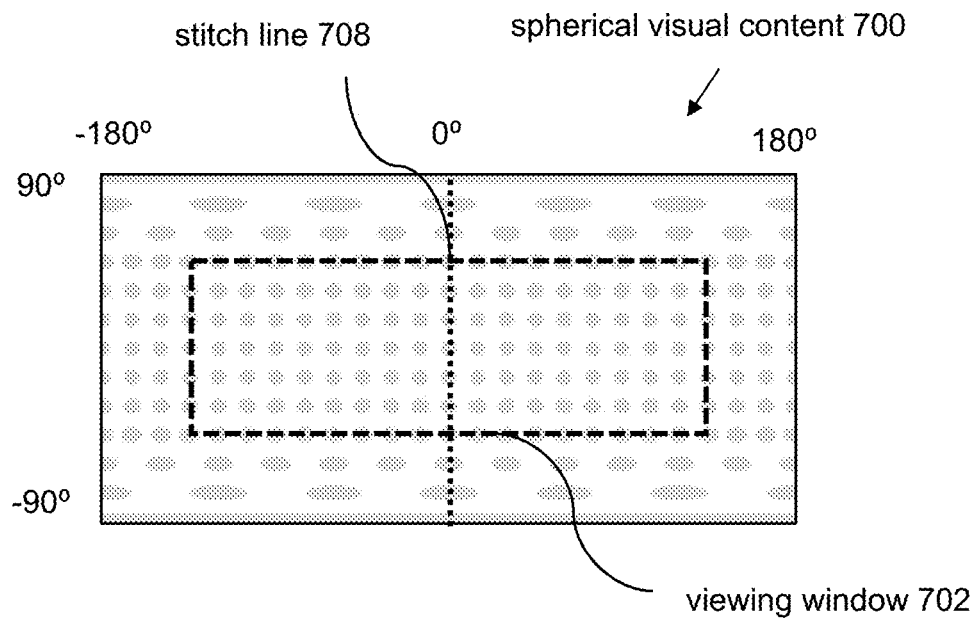
FIGS. 7A, 7B, 7C, and 7D illustrate example viewing windows.
Figure 7B:
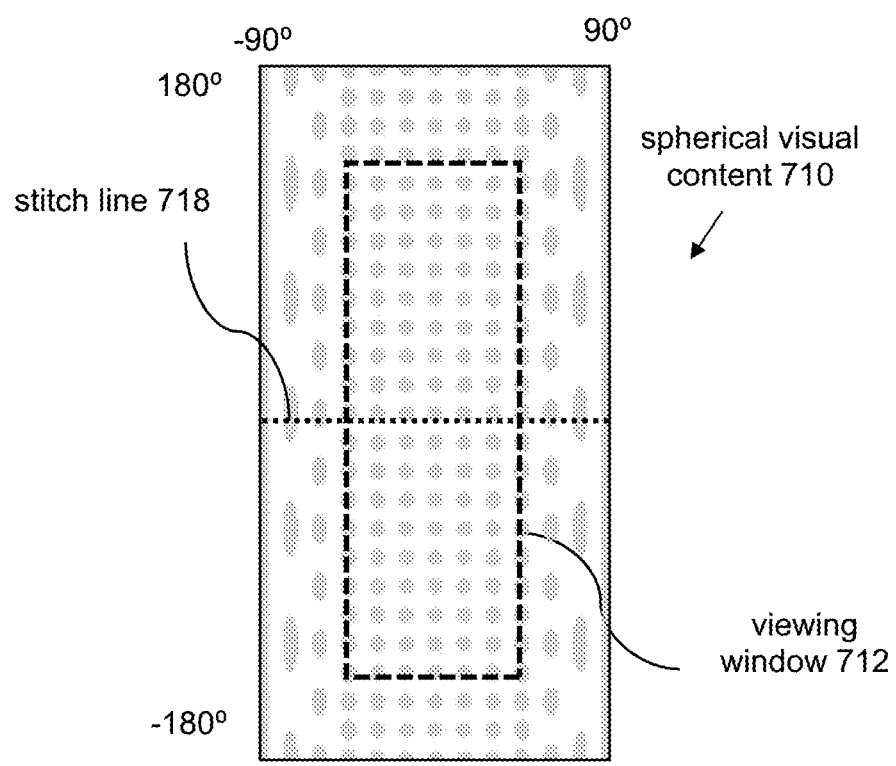

For example, a viewing window 610 in FIGS. 6A and 7B may define an extent of the spherical visual content 600 to be included within a punchout of the spherical visual content 600. The extent defined by the viewing window 610 may include a front spatial portion of the spherical visual content 600. For example, the viewing window 610 may include depiction of a portion of a scene in front of the image capture device used to capture the spherical visual content 600. The stitch line 658 may run through the viewing window 610. The stitch line 658 may divide the extent of the spherical visual content 600 within the viewing window 610 include two portions.

A viewing window with a panoramic field of view may be used to generate enhanced panoramic visual content. The panoramic field of view may provide a single continuous view of the scene captured within the spherical visual content. For example, the panoramic field of view may provide a single continuous view of a scenic scene captured within the spherical visual content.

The panoramic field of view may refer to may refer to size, shape, and/or aspect ratio of the viewing window. The panoramic field of view of the viewing window may include a wide field of view, a tall field of view, and/or other field of view. The panoramic field of view of the viewing window may include one dimensional field of view (e.g., visible extent in one direction) that is at least as twice as large as another dimensional field of view (e.g., visible extent in perpendicular direction). For example, a wide field of view may have a horizontal field of view that is at least as twice as large as a vertical field of view (aspect ratio of at least 2:1). A tall field of view (e.g., to create vertoramas) may have a vertical field of view that is at least as twice as large as a horizontal field of view (aspect ratio of 1:2 or less). Other aspect ratios of panoramic field of view are contemplated.

For example, the panoramic field of view of the viewing window may include a ninety-degree (or less) vertical field of view and a two-hundred seventy-degree horizontal field of view. Usage of such panoramic field of view may enable presentation/extraction of a wide view depicted within the spherical visual content. FIGS. 7A, 7B, 7C, and 7D illustrate example viewing windows 702, 712, 722, 732. The viewing windows 702, 712, 722, 732 may have a panoramic field of view.

In some implementations, the panoramic field of view may be determined based on user input and/or other information. For example, a user may be provided with one or more options to select the panoramic field of view (e.g., horizontal panorama option, vertical panorama option, custom panorama option), and the panoramic field of view may be determined based on the option(s) selected by the user. Other rotations and degrees of panoramic field of view are contemplated.

The viewing windows 702, 712, 722, 732 may be used to generate enhanced panoramic visual content. The image capture device being rotated into the enhanced panoramic rotational position may include stitch lines 708, 718, 728, 738 for spherical visual content 700, 710, 720, 730 being aligned with a mid-line of the panoramic field of view of a scene (field of view of the scene to be included within the enhanced panoramic visual content). A mid-line of a panoramic field of view may refer to a line that runs along a middle of the panoramic field of view. For example, a mid-line of a panoramic field of view may include a horizontal mid-line of the panoramic field of view, such as the stitch line 708 in FIG. 7A. A mid-line of a panoramic field of view may include a vertical mid-line of the panoramic field of view, such as the stitch line 718 in FIG. 7B. A mid-line of a panoramic field of view may include a slanted mid-line of the panoramic field of view, such as the stitch line 738 in FIG. 7D. A mid-line of a panoramic field of view may refer to a line between two portions of the panoramic field of view. For example, a mid-line of a panoramic field of view of a scene may divide the scene into a bright scene portion and a dark scene portion. The mid-line of a panoramic field of view of a scene may run along a dark to bright/bright to dark transition within the scene. Two portions of the panoramic field of view may be equal in size. Two portions of the panoramic field of view may be approximately equal in size (e.g., difference in sizes being within a threshold difference).

Figure 7C:
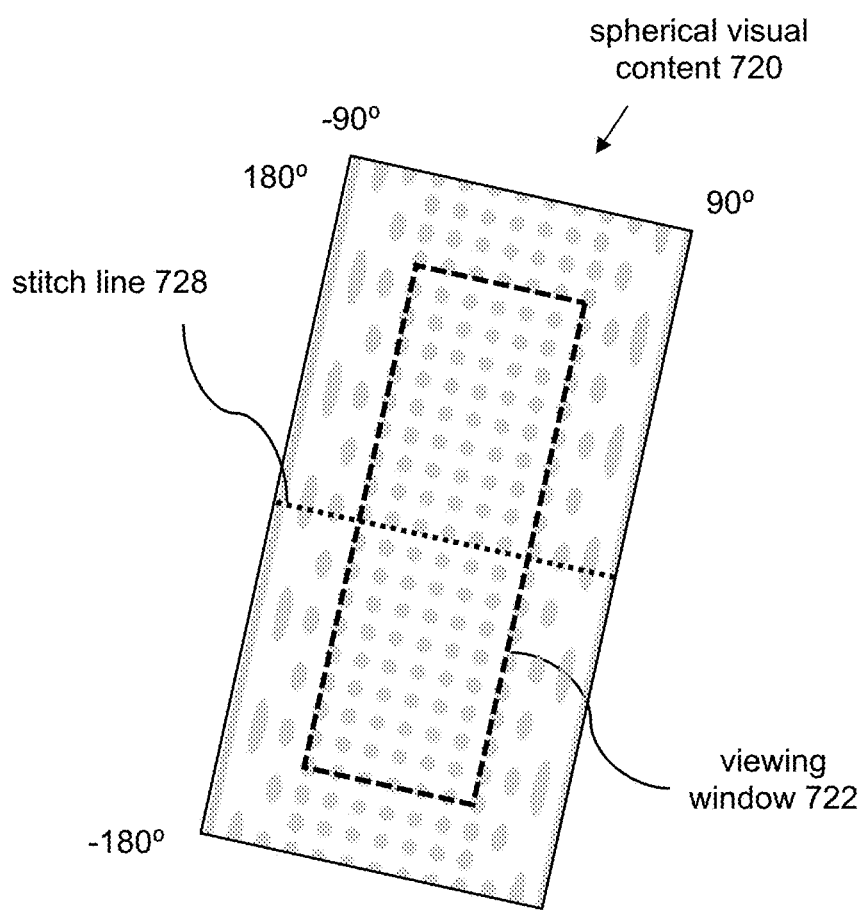
Figure 7D:
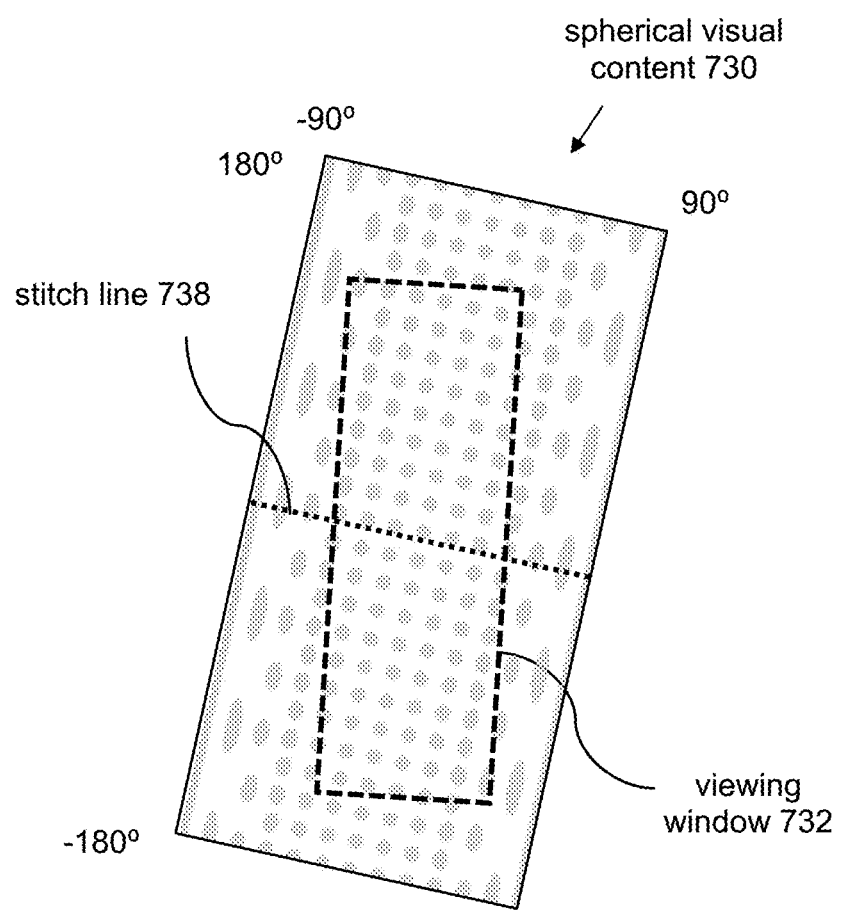

A stitch line being aligned with a mid-line of a panoramic field of view may include the stitch line running along the mid-line, the stitch line running parallel to the mid-line, the stitch line being within a threshold distance from the mid-line, and/or the angular deviation of the stitch line from the mid-line being within a threshold angle. For example, in FIGS. 7A, 7B, 7C, the stitch lines 708, 718, 728 may be aligned with the mid-line of the panoramic field of view by running along the mid-line of the panoramic field of view. In FIG. 7D, the stitch line 738 may be aligned with the mid-line of the panoramic field of view by running at an angle that deviates from the mid-line by less than a threshold angle. The stitch line may be aligned with the dark-to-bright/bright-to-dark transition within the scene. For example, the stitch line may be aligned with the horizon, with the sky being brighter than the ground. For instance, the stitch line may be aligned with horizon mid-line of the panoramic field of view for vertical panoramas and to vertical center line for horizontal panoramas.

The exposure setting component 102 may be configured to determine separate exposure settings to capture visual content on different sides of the stitch line. For example, in FIG. 7A, the exposure setting component 102 may determine one exposure setting to capture visual content on left side of the stitch line 708 and another exposure setting to capture visual content on right side of the stitch line 708. In FIG. 7B, the exposure setting component 102 may determine one exposure setting to capture visual content on top side of the stitch line 718 and another exposure setting to capture visual content on bottom side of the stitch line 718. In FIG. 7C, the exposure setting component 102 may determine one exposure setting to capture visual content on top side of the stitch line 728 and another exposure setting to capture visual content on bottom side of the stitch line 728. In FIG. 7D, the exposure setting component 102 may determine one exposure setting to capture visual content on top side of the stitch line 738 and another exposure setting to capture visual content on bottom side of the stitch line 738. The exposure settings may be determined to increase (e.g., maximize) dynamic range of the scene within the panoramic field of view.

In some implementations, the image capture device may include one or more displays, and the display(s) may present at least a portion of the panoramic field of view of the scene as a preview of the enhanced panoramic visual content. That is, the display(s) may provide a view of the scene that may be captured as enhanced panoramic visual content. For example, referring to FIG. 7A, the preview may include presentation of the scene within the viewing window 702.

The preview may include one or more guides for a user to position the image capture device into the enhanced panoramic rotational position. For example, the preview including one or more visual indicators representing the stitch line. Referring to FIG. 7A, the preview may include a visual indicator that represents the stitch line 708. For instance, the preview may include a line that depicts the location of the stitch line 708. Such presentation of visual indicator(s) may enable a user to frame the shot to be captured by using the stitch line as a guide. Such presentation of visual indicator(s) may enable a user to position the image capture device into the enhanced panoramic rotational position. Such presentation of visual indicators may enable a user to frame the shot to be captured by using the stitch line as a guide. Such presentation of visual indictor(s) may be used to guide a user in decide how to frame the shot in capturing enhanced panoramic visual content.

As another example, the preview and/or the display(s) may present one or more differences between separate exposure settings. For example, the preview and/or the display(s) may present difference(s) between the exposure setting to be used to capture visual content on one side of the stitch line and the exposure setting to be used to capture visual content on the other side of the stitch line. The preview and/or the display(s) may present one or more difference between conditions that affect exposure setting determination. For example, the preview and/or the display(s) may present difference(s) between the luminance of the scene on one side of the stitch line and the luminance of the scene on the other side of the stitch line. Such presentation of difference(s) may enable a user to frame the shot to be captured by using the difference(s) as a guide. Such presentation of difference(s) may enable a user to position the image capture device into the enhanced panoramic rotational position. Such presentation of difference(s) may enable a user to frame the shot to be captured by using the difference(s) as a guide. Such presentation of difference(s) may be used to guide a user in decide how to frame the shot in capturing enhanced panoramic visual content.

The capture component 104 may be configured to capture visual content through the optical elements. The capture component 104 may be configured to capture the visual content based on exposure settings determined by the exposure setting component 102 and/or other information. The capture component 104 may be configured to capture the visual content using exposure settings determined by the exposure setting component 102 and/or other information. The capture component 104 may be configured to capture the visual content by applying the exposure settings determined by the exposure setting component 102 to the corresponding image sensors. Applying an exposure setting to an image sensor may include operating the image sensor and/or other associated component (e.g., optical element, shutter) based on the exposure setting to capture visual content. Applying an exposure setting to an image sensor may include operating the image sensor and/or other associated component in accordance with the exposure setting to capture visual content. For example, referring to FIG. 5, the capture component 104 may capture visual content through the optical element A 504A using the exposure setting determined for the image sensor A 506A. The visual content may be captured by applying the exposure setting determined for the image sensor A 506A to the image sensor A 506A. The capture component 104 may capture visual content through the optical element B 504B using the exposure setting determined for the image sensor B 506B. The visual content may be captured by applying the exposure setting determined for the image sensor B 506B to the image sensor B 506B. The capture component 104 may be configured to capture visual content with the image capture device rotated into an enhanced panoramic rotational position and/or other position.

The capture component 104 may be configured to capture the visual content during one or more capture durations. A capture duration may refer to a time duration in which visual content is captured. Capturing visual content during a capture duration may include recording, storing, and/or otherwise capturing the visual content during the capture duration. The visual content may be captured for use in generating images and/or video frames, such as images and/or video frames having a panoramic field of view. The visual content may be captured for use in determining exposure settings.

For example, during a capture duration, the capture component 104 may use the visual output signals generated by the image sensors 506A, 506B and/or the visual information conveyed by the visual output signals to record, store, and/or otherwise capture the visual content. For instance, the capture component 104 may store, in the electronic storage 13 and/or other (permanent and/or temporary) electronic storage medium, information (e.g., the visual information) defining the visual content based on the visual output signals generated by the image sensors 506A, 506B and/or the visual information conveyed by the visual output signals during the capture duration. In some implementations, information defining the captured visual content may be stored in one or more visual tracks. In some implementations, the information defining the visual content may be discarded. For instance, the visual information defining the visual content may be temporarily stored for use in generating panoramic visual content, and the visual information may be deleted after the generation of the panoramic visual content.

The generation component 106 may be configured to generate enhanced panoramic visual content based on stitching and cropping of the visual content captured through different optical elements. Enhanced panoramic visual content may have the panoramic field of view. The generation component 106 may be configured to generate enhanced panoramic visual content based on stitching and cropping of the visual content captured using separate exposure settings. For example, referring to FIG. 5, the generation component 106 may generate enhanced panoramic visual content based on stitching and cropping of the visual content captured through the optical element A 504A using the exposure setting determined for the image sensor A 506A and the visual content captured through the optical element B 504B using the exposure setting determined for the image sensor B 506B.

Use of separate exposure settings determined with the image capture device rotated into the enhanced panoramic rotational position may result in the enhanced panoramic visual content having greater dynamic range than standard panoramic visual content (e.g., panoramic visual content captured with stitch line not aligned with the mid-line of the panoramic field of view of the scene). Use of separate exposure settings determined with the image capture device rotated into the enhanced panoramic rotational position may result in highlights of the scene being better preserved within the enhanced panoramic visual content and/or the enhanced panoramic visual content including more/better lowlight details compared to standard panoramic visual content. One or more high-dynamic range processing techniques may be used in generation of the enhanced panoramic visual content and/or post-processing of the enhanced panoramic visual content. In some implementations, one or more differences in exposure settings applied to the image sensors may be compensated by a local exposure compensation algorithm, a blending algorithm, and/or other algorithm.

Cropping of the visual content may include removal of unwanted areas from the visual content for generation of the enhanced panoramic visual content. For example, extents of the visual content outside the viewing window may be removed. Extents of the visual content within the viewing window may be punched out for inclusion in the enhanced panoramic visual content. The enhanced panoramic visual content may be generated to provide a panoramic view of the visual content. Inclusion of the extent(s) of the visual content defined by the viewing window within the panoramic visual content may effectuate panoramic viewing of the visual content via selective cropping.

In some implementations, cropping of the visual content may be performed after stitching of the visual content. For example, two hemispherical views of the scene may be stitched into spherical visual content, and the panoramic field of view may be punched out of the spherical visual content for generation of the enhanced panoramic visual content. As another example, the portions of the hemispherical views of the scene within the panoramic field of view may be stitched together, and the panoramic field of view may be punched out of the spherical visual content for generation of the enhanced panoramic visual content. In some implementation, stitching of the visual content may be performed after cropping of the visual content. For example, extents of the hemispherical views of the scene needed to provide the panoramic field of view may be punched out of individual hemispherical views, and the punched out extents may be stitched together for generation of the enhanced panoramic visual content.

Use of different exposure settings to capture different hemispherical views of the scene may result in different brightness of the visual content that define the hemispherical views. Simply stitching the separate visual content may result in a boundary line that divides the scene into a bright/brighter depiction and a dark/darker depiction. The visual content may be modified to provide a more seamless transition between the differently captured visual content. For example, gain values of the visual content may be progressively changed so that the separate visual content have the same/common gain value along the stitch line. The gain values may increase further away from the stitch line to provide increased dynamic range of the scene. In some implementations, the visual content captured through different optical elements may be processed using one or more of the techniques described in U.S. patent application Ser. No. 16/142,416, filed Sep. 26, 2019, and entitled "SATURATION MANAGEMENT FOR LUMINANCE GAINS IN IMAGE PROCESSING," and International Application Number PCT/US2018/056226, filed Oct. 17, 2018, and entitled LOCAL EXPOSURE COMPENSATION, each of the foregoing being incorporated herein by reference in its entirety.

In some implementations, enhanced panoramic visual content may be generated as standalone images. For example, enhanced panoramic visual content may be generated for inclusion in a single image for viewing. In some implementations, enhanced panoramic visual content may be generated as video frames. For example, enhanced panoramic visual content may be generated for inclusion in video frames of a panoramic video.

In some implementations, enhanced panoramic visual content may be generated as an encoded version/copy of the enhanced panoramic visual content (e.g., encoded image/video file) and/or a director track that defines the extents of the visual content to be used during presentation. For example, the enhanced panoramic visual content may be generated as one or more images and/or video frames in a video file. The image(s)/video may be opened for presentation of the enhanced panoramic visual content. The enhanced panoramic visual content may be generated as instructions to render the visual content for presentation. The instructions (e.g., director track) may which define visual portions of the visual content (e.g., which portions of spherical images, spherical video frames) should be included within the presentation of the visual content. The instructions may include information on the placement of the viewing window/punchout of the visual content to be used to provide a panoramic view of the scene. An image/video application may use the instructions to retrieve the relevant extents of the visual content to be presented to provide the panoramic view of the scene when the visual content is opened and/or is to be presented.

The generation component 106 may be configured effectuate storage of the enhanced panoramic visual content and/or other information in one or more storage media. For example, the enhanced panoramic visual content (e.g., image file, video file, director track) may be stored in the electronic storage 13, remote storage locations (storage media located at/accessible through a server), and/or other locations. In some implementations, the generation component 106 may effectuate storage of the enhanced panoramic visual content through one or more intermediary devices. For example, the processor 11 may be located within a computing device without a connection to the storage device (e.g., the computing device lacks WiFi/cellular connection to the storage device). The generation component 106 may effectuate storage of the enhanced panoramic visual content through another device that has the necessary connection (e.g., the computing device using a WiFi/cellular connection of a paired mobile device, such as a smartphone, tablet, laptop, to store information in one or more storage media). Other storage locations for and storage of the enhanced panoramic visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
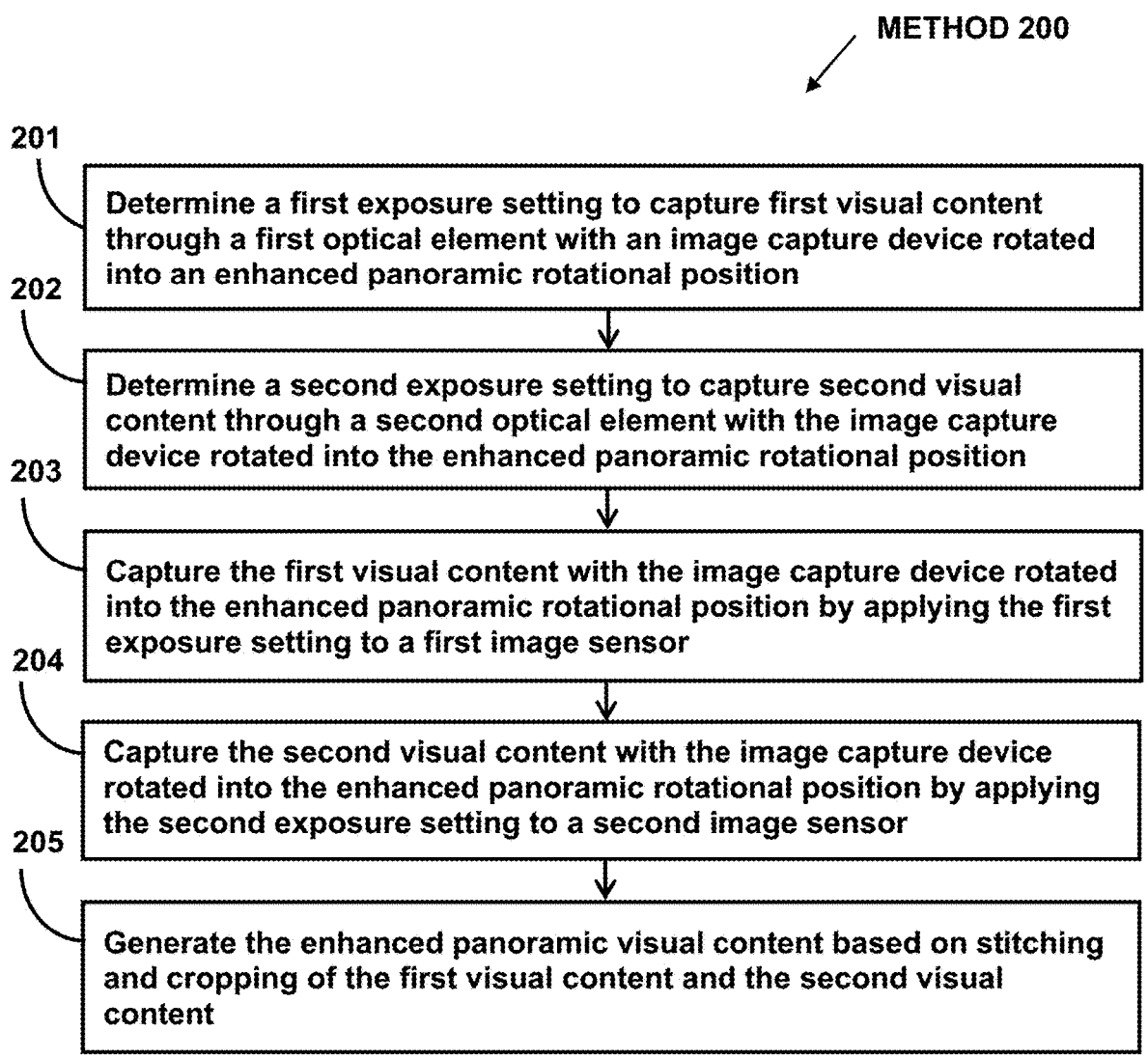
FIG. 2 illustrates an example method for generating enhanced panoramic visual content.

FIG. 2 illustrates method 200 for generating enhanced panoramic visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include one or more of a first image sensor, a second image sensor, a first optical element configured to guide light within a first field of view to the first image sensor, a second optical element configured to guide light within a second field of view to the second image sensor, and/or other components. The first image sensor may generate a first visual output signal conveying first visual information based on light that becomes incident thereon. The first visual information may define first visual content. The second image sensor may generate a second visual output signal conveying second visual information based on light that becomes incident thereon. The second visual information may define second visual content. An overlap of a peripheral portion of the first field of view and a peripheral portion of the second field of view overlap may enable spherical capture of visual content based on stitching of the first visual content and the second visual content. A stitch line for stitching of the first visual content and the second visual content may be positioned within the overlap.

At operation 201, a first exposure setting may be determined to capture the first visual content through the first optical element with the image capture device rotated into an enhanced panoramic rotational position. The enhanced panoramic rotational position may include the stitch line aligned with a mid-line of a panoramic field of view of a scene to be included within the enhanced panoramic visual content. The first exposure setting may be determined based on a first luminance of the scene included within the first field of view and/or other information. In some implementation, operation 201 may be performed by a processor component the same as or similar to the exposure setting component 102 (Shown in FIG. 1 and described herein).

At operation 202, a second exposure setting may be determined to capture the second visual content through the second optical element with the image capture device rotated into the enhanced panoramic rotational position. The second exposure setting may be determined based on a second luminance of the scene included within the second field of view and/or other information. The first exposure setting may be different from the second exposure setting based on the first luminance of the scene being different from the second luminance of the scene. In some implementation, operation 202 may be performed by a processor component the same as or similar to the exposure setting component 102 (Shown in FIG. 1 and described herein).

At operation 203, the first visual content may be captured with the image capture device rotated into the enhanced panoramic rotational position by applying the first exposure setting to the first image sensor. In some implementation, operation 203 may be performed by a processor component the same as or similar to the capture component 104 (Shown in FIG. 1 and described herein).

At operation 204, the second visual content may be captured with the image capture device rotated into the enhanced panoramic rotational position by applying the second exposure setting to the second image sensor. In some implementation, operation 204 may be performed by a processor component the same as or similar to the capture component 104 (Shown in FIG. 1 and described herein).

At operation 205, the enhanced panoramic visual content may be generated based on stitching and cropping of the first visual content and the second visual content. The enhanced panoramic visual content may have the panoramic field of view. In some implementation, operation 205 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating enhanced panoramic visual content, the image capture device comprising:
    a housing;
    a first image sensor carried by the housing and configured to generate a first visual output signal conveying first visual information based on light that becomes incident thereon, the first visual information defining first visual content;
    a second image sensor carried by the housing and configured to generate a second visual output signal conveying second visual information based on light that becomes incident thereon, the second visual information defining second visual content;
    a first optical element carried by the housing and configured to guide light within a first field of view to the first image sensor, the first field of view being greater than 180 degrees;
    a second optical element carried by the housing and configured to guide light within a second field of view to the second image sensor, the second field of view being greater than 180 degrees, wherein:
        the first optical element and the second optical element are carried by the housing such that a peripheral portion of the first field of view and a peripheral portion of the second field of view overlap;
        the overlap of the peripheral portion of the first field of view and the peripheral portion of the second field of view enables spherical capture of visual content based on stitching of the first visual content and the second visual content; and
        a stitch line for stitching the first visual content and the second visual content is positioned within the overlap; and
    one or more physical processors carried by the housing, the one or more physical processors configured by machine-readable instructions to:
        determine a first exposure setting to capture the first visual content, the first exposure setting determined based on a first luminance of a scene included within the first field of view;
        determine a second exposure setting to capture the second visual content, the second exposure setting determined based on a second luminance of the scene included within the second field of view, the first exposure setting being different from the second exposure setting based on the first luminance of the scene being different from the second luminance of the scene;
        capture the first visual content by applying the first exposure setting to the first image sensor;
        capture the second visual content by applying the second exposure setting to the second image sensor; and
        generate panoramic visual content based on stitching and cropping of the first visual content and the second visual content, the panoramic visual content having a panoramic field of view, wherein the panoramic visual content includes the enhanced panoramic visual content based on capture of the first visual content and the second visual content with the housing rotated into an enhanced panoramic rotational position.

2. The image capture device of claim 1, wherein the enhanced panoramic rotational position of the housing causes alignment of the stitch line with a mid-line of the panoramic field of view of the scene.

3. The image capture device of claim 2, wherein the mid-line of the panoramic field of view of the scene divides the scene into a bright scene portion and a dark scene portion.

4. The image capture device of claim 2, wherein the mid-line of the panoramic field of view includes a vertical mid-line of the panoramic field of view.

5. The image capture device of claim 2, wherein the mid-line of the panoramic field of view includes a horizontal mid-line of the panoramic field of view.

6. The image capture device of claim 2, wherein the mid-line of the panoramic field of view includes a slanted mid-line of the panoramic field of view.

7. The image capture device of claim 1, wherein the first exposure setting and the second exposure setting are determined to increase dynamic range of the scene depicted within the panoramic visual content.

8. The image capture device of claim 1, further comprising a display carried by the housing, the display presenting at least a portion of the panoramic field of view of the scene as a preview of the panoramic visual content, the preview including a visual indicator representing the stitch line.

9. The image capture device of claim 1, further comprising a display carried by the housing, the display presenting a difference between the first exposure setting and the second exposure setting or a difference between the first luminance of the scene and the second luminance of the scene.

10. A method for generating enhanced panoramic visual content, the method performed by an image capture device including one or more processors, a first image sensor, a second image sensor, a first optical element, and a second optical element, the first image sensor configured to generate a first visual output signal conveying first visual information based on light that becomes incident thereon, the first visual information defining first visual content, the second image sensor configured to generate a second visual output signal conveying second visual information based on light that becomes incident thereon, the second visual information defining second visual content, the first optical element configured to guide light within a first field of view to the first image sensor, and the second optical element configured to guide light within a second field of view to the second image sensor, an overlap of a peripheral portion of the first field of view and a peripheral portion of the second field of view overlap enabling spherical capture of visual content based on stitching of the first visual content and the second visual content, a stitch line for stitching of the first visual content and the second visual content positioned within the overlap, the method comprising:
  determining, by the image capture device, a first exposure setting to capture the first visual content, the first exposure setting determined based on a first luminance of a scene included within the first field of view;
  determining, by the image capture device, a second exposure setting to capture the second visual content, the second exposure setting determined based on a second luminance of the scene included within the second field of view, the first exposure setting being different from the second exposure setting based on the first luminance of the scene being different from the second luminance of the scene;
  capturing, by the image capture device, the first visual content by applying the first exposure setting to the first image sensor;
  capturing, by the image capture device, the second visual content by applying the second exposure setting to the second image sensor; and
  generating, by the one or more processors, panoramic visual content based on stitching and cropping of the first visual content and the second visual content, the panoramic visual content having a panoramic field of view, wherein the panoramic visual content includes the enhanced panoramic visual content based on capture of the first visual content and the second visual content with the image capture device rotated into an enhanced panoramic rotational position.

11. The method of claim 10, wherein the enhanced panoramic rotational position of the image capture device causes alignment of the stitch line with a mid-line of the panoramic field of view of the scene.

12. The method of claim 11, wherein the mid-line of the panoramic field of view of the scene divides the scene into a bright scene portion and a dark scene portion.

13. The method of claim 11, wherein the mid-line of the panoramic field of view includes a vertical mid-line of the panoramic field of view.

14. The method of claim 11, wherein the mid-line of the panoramic field of view includes a horizontal mid-line of the panoramic field of view.

15. The method of claim 11, wherein the mid-line of the panoramic field of view includes a slanted mid-line of the panoramic field of view.

16. The method of claim 10, wherein the first exposure setting and the second exposure setting are determined to increase dynamic range of the scene depicted within the panoramic visual content.

17. The method of claim 10, wherein at least a portion of the panoramic field of view of the scene is presented on a display as a preview of the panoramic visual content, the preview including a visual indicator representing the stitch line.

18. The method of claim 10, wherein a difference between the first exposure setting and the second exposure setting or a difference between the first luminance of the scene and the second luminance of the scene is presented on a display.

19. An image capture device for generating enhanced panoramic visual content, the image capture device comprising:
  a housing;
  a first image sensor carried by the housing and configured to generate a first visual output signal conveying first visual information based on light that becomes incident thereon, the first visual information defining first visual content;
  a second image sensor carried by the housing and configured to generate a second visual output signal conveying second visual information based on light that becomes incident thereon, the second visual information defining second visual content;
  a first optical element carried by the housing and configured to guide light within a first field of view to the first image sensor, the first field of view being greater than 180 degrees;
  a second optical element carried by the housing and configured to guide light within a second field of view to the second image sensor, the second field of view being greater than 180 degrees, wherein:
    the first optical element and the second optical element are carried by the housing such that a peripheral portion of the first field of view and a peripheral portion of the second field of view overlap;
    the overlap of the peripheral portion of the first field of view and the peripheral portion of the second field of view enables spherical capture of visual content based on stitching of the first visual content and the second visual content; and
    a stitch line for stitching of the first visual content and the second visual content is positioned within the overlap; and
  one or more physical processors carried by the housing, the one or more physical processors configured by machine-readable instructions to:
    determine a first exposure setting to capture the first visual content, the first exposure setting determined based on a first luminance of a scene included within the first field of view;
    determine a second exposure setting to capture the second visual content, the second exposure setting determined based on a second luminance of the scene included within the second field of view, the first exposure setting being different from the second exposure setting based on the first luminance of the scene being different from the second luminance of the scene, wherein the first exposure setting and the second exposure setting are determined to increase dynamic range of the scene depicted within panoramic visual content;
    capture the first visual content by applying the first exposure setting to the first image sensor;
    capture the second visual content by applying the second exposure setting to the second image sensor; and
    generate the panoramic visual content based on stitching and cropping of the first visual content and the second visual content, the panoramic visual content having a panoramic field of view, wherein the panoramic visual content includes the enhanced panoramic visual content based on capture of the first visual content and the second visual content with the housing rotated into an enhanced panoramic rotational position, wherein the enhanced panoramic rotational position of the housing causes alignment of the stitch line with a mid-line of the panoramic field of view of the scene.

20. The image capture device of claim 19, further comprising a display carried by the housing, the display presenting:
- at least a portion of the panoramic field of view of the scene as a preview of the panoramic visual content, the preview including a visual indicator representing the stitch line;
- a difference between the first exposure setting and the second exposure setting; or
- a difference between the first luminance of the scene and the second luminance of the scene.

* * * * *